United States Patent
Allen et al.

(10) Patent No.: US 11,449,132 B2
(45) Date of Patent: Sep. 20, 2022

(54) EMULATED COMPUTING DEVICE IN ENHANCED REALITY ENVIRONMENTS

(71) Applicant: HEWLETT-PACKARD DEVELOPMENT COMPANY, L.P., Spring, TX (US)

(72) Inventors: William Allen, Corvallis, OR (US); Carlos Haas Costa, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/052,153

(22) PCT Filed: Oct. 9, 2018

(86) PCT No.: PCT/US2018/055021
§ 371 (c)(1),
(2) Date: Oct. 30, 2020

(87) PCT Pub. No.: WO2020/076305
PCT Pub. Date: Apr. 16, 2020

(65) Prior Publication Data
US 2021/0357019 A1 Nov. 18, 2021

(51) Int. Cl.
*G06F 3/01* (2006.01)
*G06K 7/14* (2006.01)
*G06T 19/00* (2011.01)
*H04W 4/02* (2018.01)

(52) U.S. Cl.
CPC ............ *G06F 3/011* (2013.01); *G06K 7/1417* (2013.01); *G06T 19/006* (2013.01); *H04W 4/025* (2013.01)

(58) Field of Classification Search
CPC ..... G06F 3/011; G06K 7/1417; G06T 19/006; H04W 4/025
See application file for complete search history.

(56) References Cited

U.S. PATENT DOCUMENTS

| | | | |
|---|---|---|---|
| 5,990,955 A * | 11/1999 | Koz | H04N 19/176 375/240.01 |
| 7,319,992 B2 | 1/2008 | Gaos et al. | |
| 8,944,928 B2 | 2/2015 | Kaps et al. | |
| 2014/0030686 A1 | 10/2014 | Miller et al. | |
| 2016/0188943 A1* | 6/2016 | Franz | G06Q 20/203 705/21 |
| 2017/0083083 A1 | 3/2017 | Chu | |
| 2018/0150387 A1* | 5/2018 | Kogan | G06F 11/3684 |

FOREIGN PATENT DOCUMENTS

| EP | 3299930 | 3/2018 |
|---|---|---|
| KR | 100678312 | 2/2007 |

* cited by examiner

*Primary Examiner* — Alexander Eisen
*Assistant Examiner* — Kebede T Teshome
(74) *Attorney, Agent, or Firm* — Fabian VanCott

(57) ABSTRACT

A computing device generating an enhanced reality environment may include, in an example, a processor to execute the enhanced reality environment on the computing device and emulate hardware associated with a real-world mobile computing device within the enhanced reality environment; a network adapter to communicatively couple the computing device to the real-world mobile computing device; and an enhanced reality data capture module to capture data defining the enhanced reality environment and deliver the data to the mobile computing device to be processed by an app associated with the real-world mobile computing device.

20 Claims, 4 Drawing Sheets

EMULATED COMPUTING DEVICE IN ENHANCED REALITY ENVIRONMENTS

BACKGROUND

Enhanced reality systems allow a user to become immersed in an enhanced reality environment wherein they can interact with the enhanced environment. Enhanced reality systems include augmented reality, virtual reality, and mixed reality systems that involve users interacting with real and/or perceived aspects of an environment in order to manipulate and/or interact with that environment. In the example of a virtual reality system, a head-mounted display (HMD), using stereoscopic display devices, allows a user to see and become immersed in any processor executed virtual scene.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
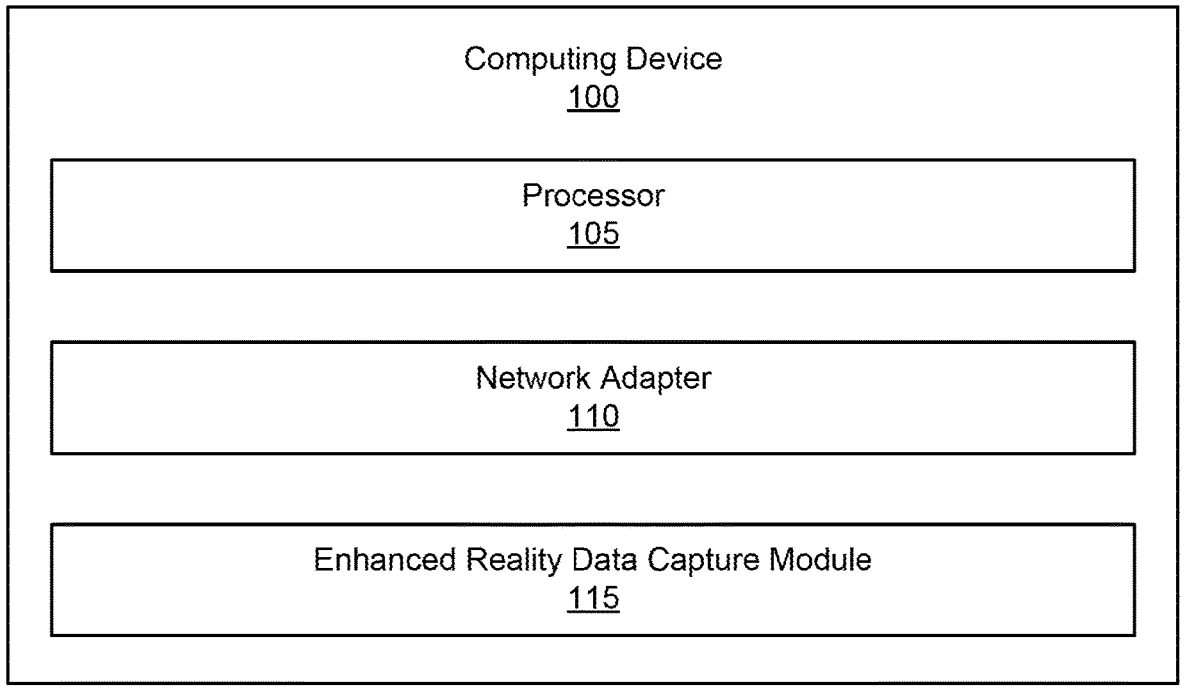
FIG. 1 is a block diagram of a computing device generating an enhanced reality environment according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Enhanced reality systems immerse a user in a world that mimics a real-world experience. Despite this mimicking of the real world, actual real-world results are not realized outside the activities presented within the enhanced reality world created by the enhanced reality systems. Indeed, as the popularity of these enhanced reality systems increases, the extension of the enhanced reality environment into the real-world may enhance the experience of the user.

According to the present specification the extension of the enhanced reality environment into the real-world may allow a user to post a photo of the enhanced reality environment to a social media forum; scan a barcode within the enhanced reality environment as input into a personal device, use a location within the enhanced reality environment as a location used by the personal device, and use the enhanced reality environment to access a myriad of different apps on a user's personal device.

The present specification describes a computing device generating an enhanced reality environment that includes a processor to execute the enhanced reality environment on the computing device and emulate hardware associated with a real-world mobile computing device within the enhanced reality environment; a network adapter to communicatively couple the computing device to the real-world mobile computing device; and an enhanced reality data capture module to capture data defining the enhanced reality environment and deliver the data to the mobile computing device to be processed by an app associated with the real-world mobile computing device.

The present specification also describes a method that includes with a processor: executing an enhanced reality environment on a computing device and emulating hardware associated with a real-world computing device within the enhanced reality environment; capturing data descriptive of the enhanced reality environment to be processed by the real-world computing device as real-world data; and delivering the data to a mobile computing device via a network adapter.

The present specification further describes a non-transitory computer readable storage medium comprising computer usable program code embodied therewith, the computer usable program code to, when executed by a processor: execute the enhanced reality environment and emulating hardware associated with a real-world computing device within the enhanced reality environment; capture data descriptive of the enhanced reality environment to be processed by the real-world computing device as real-world data; and deliver the data to a mobile computing device via a network adapter Turning now to the figures, FIG. 1 is a block diagram of a computing device (100) generating an enhanced reality environment according to an example of the principles described herein. The computing device (100) may be any type of computing device including servers, desktop computers, laptop computers, personal digital assistants (PDAs), mobile devices, smartphones, gaming systems, and tablets, among other electronic devices. The computing device (100), in order to generate an enhanced reality environment and complete the functionality described herein, may include a processor (105). The processor (105) may execute computer readable program code in order to generate the enhanced reality environment as described herein. Additionally, the processor (105) may emulate hardware associated with a real-world computing device within the enhanced reality environment. In this example, the emulation may include any receipt of any data from a real-world computing device and present, as an image or other human discernable method, to the user an enhanced reality emulated computing device. In an example, the processor (105) may also execute computer readable program code to capture data descriptive of the enhanced reality environment to be processed by the real-world computing device as real-world data and deliver the data to a mobile computing device via a network adapter.

In an example, the computing device (100) may include a data storage device. The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor (105) may boot from Read Only Memory (ROM), maintain nonvolatile storage in the Hard Disk Drive (HDD) memory, and execute program code stored in Random Access Memory (RAM). The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The computing device (100) may also include a network adapter (110). The network adapter (110) may communicatively couple the computing device (100) to a real-world computing device. As mentioned herein, the computing device (100), while executing computer readable program code to present to a user the enhanced reality environment, may emulate a real-world computing device so as to allow a user to interact with the functionalities presented by the real-world computing device while immersed within the enhanced reality environment. In order to achieve this, the computing device (100) may receive and send data describing this interaction with the real-world computing device over a wired or wireless connection via network adapter (110). Thus, the network adapter (110) may implement any communication protocol in order to receive and send this data. In an example, the computing device (100) may receive computer readable program code that emulates a specific type of real-world computing device. In this example, the emulation may be presented to a user via a head mounted display (HMD) of, for example, a virtual reality system. Other types of enhanced reality environments may implement any display device that shows to a user some enhanced reality environment with a visual representation of the emulated real-world computing device. The emulation may include the emulation of the functionality of the real-world computing device.

By way of example, the emulated computing device emulating the real-world computing device presented to a user within the enhanced reality environment may include a camera (either rear-facing or front-facing) that allows a user to take photos within the enhanced reality environment. The data defining these images may be presented to the real-world computing device over a wired or wireless connection via the network adapter (110). In an example, these images may also be uploaded to a user's social media webpage via the user interacting with the emulated real-world computing device within the enhanced reality environment. In order to accomplish this, the user may interact with an emulated user interface of the real-world computing device within the enhanced reality environment. In this example, the emulated user interface of representing the real-world computing device may receive input from the user describing the selection of a social media app to be executed on the real-world computing device, passwords to allow a user to access the user's social media account, and other alphanumeric input from a keyboard to allow the user to interact with the functionalities of the app being executed on the real-world computing device. In an example, the interaction of the user in the enhanced reality environment with the emulated real-world computing device, may be represented in the real-world at the real-world computing device. In an example, however, the interface of the real-world computing device may be locked while the user is interacting with the enhanced reality environment presented by the computing device (100). Locking the interface of the real-world computing device may prevent anyone from gaining access to the user's real-world computing device while the user is otherwise engaged within the enhanced reality environment.

By way of example, the emulated computing device emulating the real-world computing device presented to a user within the enhanced reality environment may include a barcode reader or camera so as to capture, (quick response code) QR code. In this example, when the image or data associated with the barcode is processed, the user may be presented on an emulated screen representing the real-world computing device information associated with that barcode or QR code. This information may include any type of information such as a hyperlink to a website or a website that sells goods associated with the barcode or QR-code.

By way of example, the emulated computing device emulating the real-world computing device presented to a user within the enhanced reality environment may include an emulated global positioning satellite (GPS) device that presents to a user emulated or fictional positional location of the user within the enhanced reality environment. By way of example, the user may be immersed in an enhanced reality environment representing a scene in Paris France. The GPS device may present to a user on the screen of the emulated real-world computing device within the enhanced reality environment the GPS coordinates representative of Paris France. Similarly, where a user is immersed within a fictional enhanced reality environment, fictionalized GPS coordinates may be presented to the user. In either of these examples, the other data associated with by the user within the enhanced reality environment may also be associated with these GPS coordinates (either fictional or otherwise).

By way of example, the emulated computing device emulating the real-world computing device presented to a user within the enhanced reality environment may include an emulation of any of the apps or other executable program code of the real-world computing device. In this example, any app of, for example, a smartphone may be interacted with through emulation of that app to the user within the enhanced reality environment. Indeed, a user of the computing device (100) immersed within the enhanced reality environment may access a gaming app of the real-world computing device and play that game on an emulated computing device representing the real-world computing device. Additionally, the actions taken by the user in interacting with this emulated gaming app have real-world consequences resulting in the app on the real-world computing device registering achievements of the user during the use of the gaming app as well as the use of the gaming app as if the user had accessed the app via the real-world computing device. These real-world consequences can be realized with any apps of the real-world computing device including email apps, power point apps, spreadsheet apps, and other communication apps, among others. Indeed, those actions carried out by the user to interact with an emulated version of these apps while immersed in the enhanced reality environment may have real world consequences. In such a particular example, an email sent by the user immersed in the enhanced reality environment while interacting with an emulated email app causes the email to actually be sent to a user by the real-world computing device.

In order to capture the data defining the enhanced reality environment and deliver the data to the mobile computing device to be processed by an app associated with the real-world mobile computing device, the computing device (100) may include an enhanced reality data capture module (115). The enhanced reality data capture module (115) may, when executed by the processor (105), gather data describing input at an emulated computing device representative of the real-world computing device within the enhanced reality environment. The enhanced reality data capture module (115) may packet this data descriptive of the input and deliver it to the real-world computing device as described herein. This data may be captured by the enhanced reality data capture module (115) in real-time. This allows a user to, while immersed in the enhanced reality environment, interact with real-world events as they occur.

In a specific example, the enhanced reality data capture module (115) may capture data received by a buffer and/or driver associated with an operating system of the computing device (100). In another example, specific application program interfaces associated with and executable by the processor (105) may provide access to the data by the enhanced reality data capture module (115). Virtual sensors of the emulated computing device may similarly be emulated such that data received by the virtual sensors may be captured by the enhanced reality data capture module (115). By way of example, movement of the emulated computing device within the enhanced reality environment may be detected and accelerometer and/or magnetic data may be created representative of the movements of the emulated computing device. The creation of the movement data may be calculated using positional data of the emulated computing device within the enhanced reality environment.

In an example, as the enhanced reality environment is being created by the processor of the computing device (100), the generated data may be maintained in a buffer for consumption by the data capture module (115). Where data is indicated as to be transferred to an external computing device, the enhanced reality data capture module (115) may access the data maintained in the buffer. In an example, the enhanced reality data capture module (115) may packetize the data into packets prior to sending the data to the external computing device.

The type data packeted and sent to the real-world computing device by the enhanced reality data capture module (115) may be dependent on the type of app the user is interacting with on the emulated computing device within the enhanced reality environment. This data may include data representative of a still image captured within the enhanced reality environment, a video captured within the enhanced reality environment, any input at a screen of the emulated computing device within the enhanced reality environment, and any data received by any emulated sensor of the computing device within the enhanced reality environment, among others. During the packeting process by the enhanced reality data capture module (115), the data may be encoded using an encoding module to compress and/or encode the data prior to the data being sent to the real-world computing device.

Figure 2:
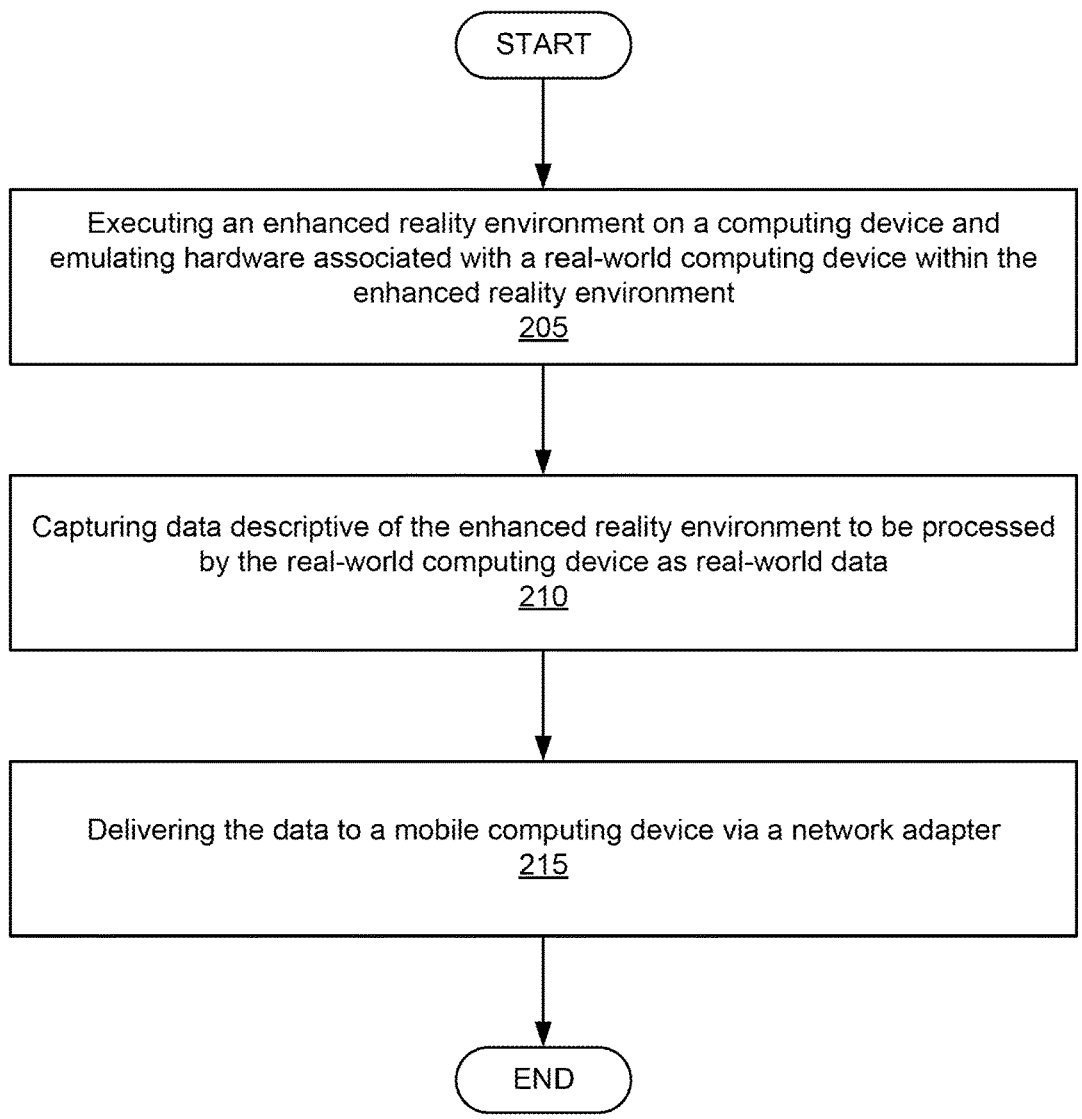
FIG. 2 is a flowchart showing a method according to an example of the principles described herein.

FIG. 2 is a flowchart showing a method (200) according to an example of the principles described herein. The method (200) may be a method engaged in by the computing device (100) described in connection with FIG. 1 herein.

In an example, the method (200) may include with a processor (105), executing (205) an enhanced reality environment on a computing device (100) and emulating hardware associated with a real-world computing device within the enhanced reality environment. The emulation of the enhanced reality environment may emulate both the hardware of the real-world computing device as well as any computer readable program code maintained on the real-world computing device as described herein.

The method (200) may include capturing (210) data descriptive of the enhanced reality environment to be processed by the real-world computing device as real-world data. As described herein, the processor (105) of the computing device (100) may execute an enhanced reality data capture module (115) in order to packet the data for delivery (215) of the data to the real-world computing device such as a mobile device.

The method (200) may also include delivering (215) the data captured by the enhanced reality data capture module (115) to a mobile computing device via a network adapter. As described herein, the data may cause real-world actions at the real-world computing device to be taken resulting in real-world consequences.

In an example, the data descriptive of the enhanced reality environment includes data descriptive of a manipulation of a virtual mobile computing device represented in the enhanced reality environment. In this example, the virtual mobile computing device may be a representation of the real-world computing device within the enhanced reality environment. In an example, the virtual mobile computing device may be manipulated by an enhanced reality input device and the processor (105) may capture data descriptive of the manipulation of a virtual mobile computing device in real time.

Figure 3:
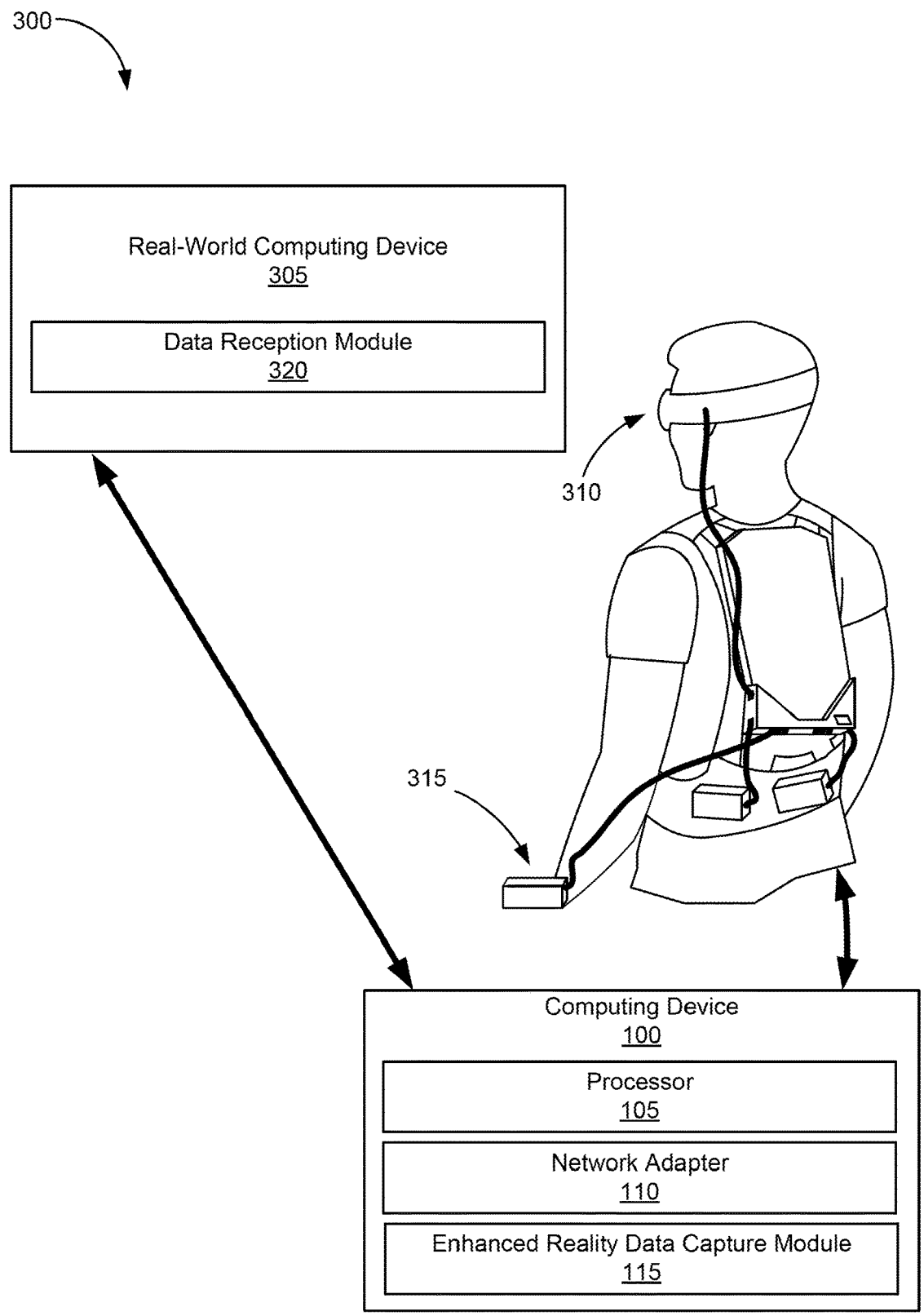
FIG. 3 is a block diagram of an enhanced reality system according to an example of the principles described herein.

FIG. 3 is a block diagram of an enhanced reality system (300) according to an example of the principles described herein. The enhanced reality system (300) may include a computing device (100) used to execute computer readable program code to present to a user of an enhanced reality display device (310) an enhanced reality environment. In the example presented in FIG. 3, the enhanced reality display device (310) may be a head mounted display (HMD) that presents to a user a view within the enhanced reality environment. In any example, a user may interact within the enhanced reality environment using a number of input devices (315) that may include handheld devices as well as any sensor that may be associated with the enhanced reality display device (310) and computing device (100).

As described herein in connection with FIG. 1, the computing device (100) may include a processor (105), network adapter (110), and enhanced reality data capture module (115). Execution of computer readable program code by the processor (105) may allow the user to see the enhanced reality environment and interact with, in the examples presented herein, an emulated version of a real-world computing device (305).

The communication between the enhanced reality display device (310), computing device (100), and real-world computing device (305) may be facilitated using the network adapter (110) as described herein. The communication may occur in real-time. The network adapter (110) may, via a wired or wireless connection, receive and send data to and from the computing device (100). This data may be descriptive of the enhanced reality environment and may include data descriptive of a manipulation of the virtual mobile computing device represented in the enhanced reality environment.

The real-world computing device (305) may include a data reception module (320). The data reception module (320) may receive the data from the computing device (100) descriptive of the manipulation of the virtual mobile computing device within the enhanced reality environment. As described herein, the data may, when processed by the data reception module (320) may cause certain apps to be activated and used via the use of the virtual mobile computing device represented in the enhanced reality environment. By way of example, a user may access an email app on the virtual mobile computing device within the enhanced reality environment. The user may input a password on the virtual mobile computing device in order to gain access to the email app on the virtual mobile computing device. Data defining this password may be packeted and encoded using an enhanced reality data capture module (115) and/or an encoding module. The packet may be sent to the real-world computing device (305) by the network adapter (110) of the computing device (100). The data reception module (320) of the real-world computing device (305) may receive this packet and execute the email app on the real-world computing device (305) gaining access through the use of the password received in the packet. The same or similar process may also occur when the user generates and sends an email using the virtual mobile computing device represented within the enhanced reality environment. The drafted email along with instructions to send the email may be sent to the real-world computing device (305) to be executed by the data reception module (320) accordingly. In this manner, the actions taken by the user immersed within the enhanced reality environment presented by the computing device (100) may have real-world consequences: actual sending of an email by the real-world computing device (305). Although an emailing scenario has been presented and descried herein, the present specification contemplates that any type of data received by the enhanced reality data capture module (115) may be sent to the data reception module (320) of the real-world computing device (305) in order to affect some action on behalf of the real-world computing device (305).

The real-world computing device (305) in any example presented herein may be any type of computing device. In a specific example, the real-world computing device (305) may be a mobile device. In this example, as the user is engaged with the enhanced reality environment provided by the computing device (100), the user may access a virtual mobile computing device representative of the user's own mobile device (305). In this example, the emulation of the user's own mobile device (305) may be real-world computing device (305) specific. Indeed, in some examples, the make and model of the real-world computing device (305) may be emulated in the enhanced reality environment as an appropriately functioning and looking real-world computing device (305). Specific computer readable program code may be assigned to any specific real-world computing device (305) so that the processor (105) of the computing device (100) may accurately represent the real-world computing device (305) within the enhanced reality environment.

Figure 4:
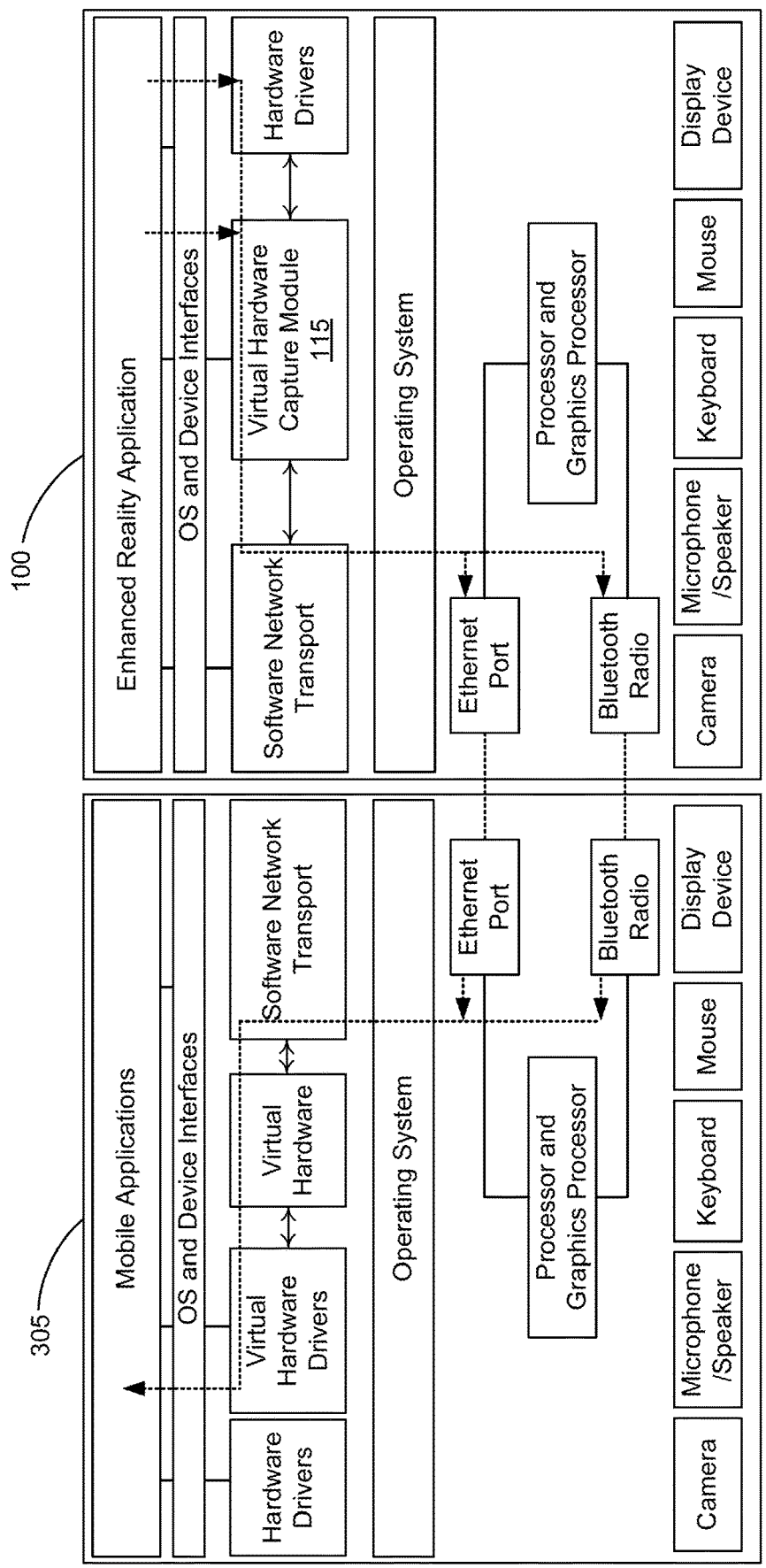
FIG. 4 is a block diagram of a network stack of the real-world computing device and computing device described in connection with FIG. 3 according to an example of the principles described herein.

FIG. 4 is a block diagram of a network stack of the real-world computing device (305) and computing device (100) described in connection with FIG. 3 according to an example of the principles described herein. The computing device (100) may include individual virtual hardware capture modules (115) that may be individual modules associated with every virtual sensor that is going to be "virtualized" (i.e.: receive data from an enhanced reality environment and use that as if it was data from the real world) by the computing device (100). These virtual hardware capture modules (115) may receive input data from a network transport receiver in submit that input data in the appropriate format to the virtual hardware capture modules. In an example, the input data received (as indicated by the dashed lines in FIG. 4) may include the virtual GPS coordinates, accelerometer data, video output, audio output, among other data descriptive of the use of an enhanced reality application and, in an example, the data descriptive of the virtual computing device presented to the user while interacting within the enhanced reality environment.

In an example, the virtual hardware capture modules may decide to synchronize all data on time, part of it, or simply present it to the next module as soon as it arrives, passing forward the information about time of capture/intended presentation, etc. By inserting data into the buffers/drivers of the operating system of the computing device (100), the operating system may allow the user to have the same experience at the real-world computing device (305) as is experienced by the user at the virtual mobile computing device.

The computing device (100) may be utilized in any data processing scenario including, stand-alone hardware, mobile applications, through a computing network, or combinations thereof. Further, the computing device (100) may be used in a computing network, a public cloud network, a private cloud network, a hybrid cloud network, other forms of networks, or combinations thereof. In one example, the methods provided by the computing device (100) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by computing device (100) are executed by a local administrator.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (105) of the computing device (100) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an emulated computing device in enhanced reality environment. The emulation of the computing device allows a user to record a photo and/or video of a view the user is can see within the enhanced reality environment. The data defining that photo and/or video may be sent to a real-world computing device (305) and cause that photo and/or video to be posted to a social media website using the user's personal social media account accessible by the real-world computing device. The system described herein, may also allow a reader to read a QR code or any other digital marking in the enhanced reality environment using an app on the virtual mobile computing device that is present on the real-world computing device (305). In this example, a user may make an electronic purchase, use a personal bank application, and may store a promo code from a virtual advertisement so as to allow the user to engage, through the real-world computing device (305), in an e-commerce activity. The present system also allows a user to implement any app already installed on the real-world computing device (305), with data from the enhanced reality environment, without having to install it in the computing device (100) executing the enhanced reality environment. Here, the double purchasing of the app is prevented thereby reducing costs to the user. The system described herein may also allow a user to record audio from the enhanced reality environment on a real-world computing device (305), or use any audio source from the enhanced reality environment as an audio source in the real-world computing device (305). The same or similar activity may be extended to other physical signals that can be virtualized, such as GPS, orientation, accelerometer, etc. This enables a user's experiences in an enhanced reality environment having a location in the enhanced reality environment as a coordinate in the real-world computing device (305).

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing device generating an enhanced reality environment, comprising:
   a processor to execute the enhanced reality environment on the computing device and emulate hardware associated with a real-world mobile computing device within the enhanced reality environment;
   a network adapter to communicatively couple the computing device to the real-world mobile computing device; and
   an enhanced reality data capture module to capture data defining the enhanced reality environment and deliver the data to the mobile computing device to be processed by an app associated with the real-world mobile computing device.

2. The computing device of claim 1, wherein the enhanced reality data capture module captures the data in real-time and delivers the data to the mobile computing device in real-time.

3. The computing device of claim 1, wherein the data comprises a still image of the enhanced reality environment.

4. The computing device of claim 1, wherein the data comprises a video image of the enhanced reality environment.

5. The computing device of claim 1, wherein the data comprises a virtual recording of a barcode represented in the enhanced reality environment.

6. The computing device of claim 1, wherein the data comprises a virtual global positioning satellite coordinate describing a virtual position within the enhanced reality environment.

7. The computing device of claim 1, wherein the data comprises data describing a position of a virtual mobile device within the enhanced reality environment.

8. The computing device of claim 1, comprising a data encoding module to compress and encode the data prior to delivery of the data to the real-world mobile computing device.

9. The computing device of claim 1, wherein the enhanced reality environment comprises a virtual mobile device with a camera that allows a user to take a photo within the enhanced reality environment.

10. The computing device of claim 9, wherein the enhanced reality data capture module is to deliver the photo taken within the enhanced reality environment to a social media app on the real-world mobile computing device.

11. The computing device of claim 1, wherein the enhanced reality environment comprises a virtual mobile device with a barcode reader that allows a user to capture a quick response (QR) code represented within the enhanced reality environment.

12. The computing device of claim 11, wherein the enhanced reality data capture module is to deliver the QR code to the real-world mobile computing device.

13. The computing device of claim 1, wherein the processor is to emulate in the enhanced reality environment an app installed on the real-world mobile computing device, and wherein the enhanced reality data capture module is to capture the data using the emulated app and deliver the data to the app installed on real-world mobile computing device.

14. A method, comprising:
   with a processor:
   executing an enhanced reality environment on a computing device and emulating hardware associated with a real-world computing device within the enhanced reality environment;
   capturing data descriptive of the enhanced reality environment to be processed by the real-world computing device as real-world data; and
   delivering the data to a mobile computing device via a network adapter.

15. The method of claim 14, wherein the data descriptive of the enhanced reality environment includes data descriptive of a manipulation of a virtual mobile computing device represented in the enhanced reality environment.

16. The method of claim 15, wherein the virtual mobile computing device is manipulated by an enhanced reality input device and wherein the processor captures data descriptive of the manipulation of a virtual mobile computing device.

17. The method of claim 15, wherein the data comprises a virtual recording of a barcode represented in the enhanced reality environment.

18. The method of claim 15, wherein the data comprises a virtual global positioning satellite coordinate describing a virtual position within the enhanced reality environment.

19. A non-transitory computer readable storage medium comprising computer usable program code embodied therewith, the computer usable program code to, when executed by a processor:
- execute the enhanced reality environment and emulating hardware associated with a real-world computing device within the enhanced reality environment;
- capture data descriptive of the enhanced reality environment to be processed by the real-world computing device as real-world data; and
- deliver the data to a mobile computing device via a network adapter.

20. The non-transitory computer readable storage medium of claim 19, wherein the data descriptive of the enhanced reality environment includes data descriptive of a manipulation of a virtual mobile computing device represented in the enhanced reality environment.

* * * * *